United States Patent
Wu et al.

(10) Patent No.: US 12,217,320 B2
(45) Date of Patent: Feb. 4, 2025

(54) SPACE RECOMMENDATION METHOD, DEVICE, AND SYSTEM BASED ON AIR CONDITIONING SYSTEM, AND STORAGE MEDIUM

(71) Applicants: GD Midea Heating & Ventilating Equipment Co., Ltd., Foshan (CN); Hefei Midea Heating & Ventilating Equipment Co., Ltd., Anhui (CN)

(72) Inventors: Kongxiang Wu, Foshan (CN); Mingren Wang, Foshan (CN); Hongwei Li, Foshan (CN); Zekun Liang, Foshan (CN); Wei Wang, Foshan (CN); Dengsong Ou, Foshan (CN); Fan Tian, Foshan (CN)

(73) Assignees: GD MIDEA HEATING & VENTILATING EQUIPMENT CO., LTD., Foshan (CN); HEFEI MIDEA HEATING & VENTILATING EQUIPMENT CO., LTD., Hefei (CN)

( * ) Notice: Subject to any disclaimer, the term of this patent is extended or adjusted under 35 U.S.C. 154(b) by 0 days.

(21) Appl. No.: 18/381,132

(22) Filed: Oct. 17, 2023

(65) Prior Publication Data
US 2024/0046382 A1    Feb. 8, 2024

Related U.S. Application Data

(63) Continuation of application No. PCT/CN2021/138497, filed on Dec. 15, 2021.

(51) Int. Cl.
*G06Q 50/12* (2012.01)
*F24F 11/46* (2018.01)
(Continued)

(52) U.S. Cl.
CPC ............. *G06Q 50/12* (2013.01); *F24F 11/46* (2018.01); *G06Q 10/02* (2013.01); *G06Q 50/06* (2013.01);
(Continued)

(58) Field of Classification Search
CPC ........ G06Q 50/12; G06Q 10/02; G06Q 50/06; F24F 11/46; F24F 2120/10; F24F 2140/60
See application file for complete search history.

(56) References Cited

U.S. PATENT DOCUMENTS

| 2015/0057813 A1 | 2/2015 | Cho |
| 2016/0044111 A1 | 2/2016 | Lee et al. |

(Continued)

FOREIGN PATENT DOCUMENTS

| CN | 106600014 A | 4/2017 |
| CN | 108447002 A | 8/2018 |

(Continued)

OTHER PUBLICATIONS

Evangelos Vrettos, Robust Energy-Constrained Frequency Reserves From Aggregations of Commercial Buildings, 2016, p. 4272-4274 (Year: 2016).*

(Continued)

*Primary Examiner* — Ibrahim N El-Bathy
(74) *Attorney, Agent, or Firm* — Morgan, Lewis & Bockius LLP

(57) ABSTRACT

A space recommendation method based on an air conditioning system includes: obtaining a user space usage request that includes demand information of a user for a space; and determining a current energy consumption amount of each of a plurality of air conditioning units of the air conditioning system. Each of the plurality of air conditioning units includes a plurality of air conditioning terminal devices, the (Continued)

plurality of air conditioning terminal devices is respectively arranged in a plurality of spaces; determining a candidate space based on the current energy consumption amount; and recommending an available space based on the demand information and the candidate space.

17 Claims, 2 Drawing Sheets

(51) Int. Cl.
    *F24F 120/10*     (2018.01)
    *F24F 140/60*     (2018.01)
    *G06Q 10/02*     (2012.01)
    *G06Q 50/06*     (2024.01)

(52) U.S. Cl.
    CPC ....... *F24F 2120/10* (2018.01); *F24F 2140/60* (2018.01)

(56) References Cited

U.S. PATENT DOCUMENTS

| | | |
|---|---|---|
| 2016/0195886 A1 | 7/2016 | Konishi et al. |
| 2017/0003043 A1 | 1/2017 | Thiébaux et al. |
| 2019/0172159 A1* | 6/2019 | Sun ................... G06Q 30/018 |
| 2020/0118045 A1* | 4/2020 | Chung ............ G06Q 10/06314 |
| 2020/0349484 A1* | 11/2020 | Serven ............ G06Q 10/06312 |
| 2021/0117875 A1* | 4/2021 | Zhang ................ G06Q 10/0833 |
| 2023/0167994 A1* | 6/2023 | Hashikawa ........ G06Q 10/0631 700/276 |

FOREIGN PATENT DOCUMENTS

| | | |
|---|---|---|
| CN | 113240550 A | 8/2021 |
| GB | 2603046 A | 3/2021 |
| WO | WO 2022157680 A2 | 7/2022 |
| WO | WO 2022157680 A3 | 7/2022 |

OTHER PUBLICATIONS

Midea Group Co., Ltd., Chinese Office Action, CN Patent Application No. 202110455560.6, Jul. 18, 2023, 15 pgs.

Midea Group Co., Ltd., ISR, PCT/CN2021/138497, Mar. 9, 2022, 2 pgs.

Midea Group Co., Ltd., Extended European Search Report, EP Patent Application No. 21939069.7, Jul. 10, 2024, 8 pgs.

\* cited by examiner

SPACE RECOMMENDATION METHOD, DEVICE, AND SYSTEM BASED ON AIR CONDITIONING SYSTEM, AND STORAGE MEDIUM

CROSS-REFERENCE TO RELATED APPLICATIONS

This application is a continuation of International (PCT) Patent Application No. PCT/CN2021/138497 filed on Dec. 15, 2021, which claims a priority to Chinese Patent Application No. 202110455560.6, filed with China National Intellectual Property Administration on Apr. 26, 2021, the entire contents of which is incorporated herein by reference.

FIELD

The present disclosure relates to the technical field of space management and the technical field of air conditioners, and in particular, to a space recommendation method, device, and system for an air conditioning system.

BACKGROUND

In an air conditioning system such as a multi-split air conditioning system or a water-cooled air conditioning system, a plurality of air conditioning terminal devices may be included. For example, the multi-split air conditioning system may include an outdoor unit and a plurality of indoor units, or include a plurality of outdoor units and a plurality of indoor units. Such an air conditioning system is typically used in a building having a plurality of spaces, such as a hotel and an office building.

As an example, a scenario where the air conditioning system is applied in the hotel is provided. A current hotel reservation visiting system may generally provide a guest with an ability to select and reserve a room. During selection and reservation, a room is generally allocated and recommended from a currently unoccupied hotel room based on guests' preference. Moreover, the guest may choose from selectable hotel rooms provided by the hotel reservation visiting system.

However, during room allocation as described above, the hotel reservation visiting system only considers availability of hotel rooms and the guest's preference instead of an operation state of the air conditioning system.

SUMMARY

Considering that spaces are simply allocated solely based on availability of the space and a user preference in an existing space recommendation method, centralized operation of an air conditioning system may not be considered during space recommendation. In this way, energy saving of the air conditioning system may be unfavorable, and energy may be wasted. In some embodiments, an air conditioner in the air conditioning system may achieve an energy-saving effect by comprehensively utilize centralized operation of the air conditioning system. To this end, the present disclosure provides a method for space recommendation based on an air conditioning system, which may perform space recommendation based on a current energy consumption amount of the air conditioning system. User demand may be effectively matched with optimization of energy consumption of the air conditioning system, and an energy-saving and cost-reducing purpose may be achieved.

The present disclosure further provides a space recommendation device based on an air conditioning system.

The present disclosure further provides a space recommendation system.

The present disclosure further provides a computer-readable storage medium.

According to some embodiments of the present disclosure, provided is a method for space recommendation based on an air conditioning system. The air conditioning system may include a plurality of air conditioning units. Each of the plurality of air conditioning units includes a plurality of air conditioning terminal devices. The plurality of air conditioning terminal devices is respectively arranged in a plurality of spaces. The method for space recommendation based on the air conditioning system may include: obtaining a user space usage request, where the user space usage request carries demand information of a user for a space; determining a current energy consumption amount of each of the plurality of air conditioning units; determining a candidate space from the plurality of spaces based on the current energy consumption amount; and recommending an available space based on the demand information and the candidate space.

According to some embodiments of the present disclosure, said determining the current energy consumption amount of each of the plurality of air conditioning units may include: obtaining a number of spaces currently occupied in the plurality of spaces; and determining the current energy consumption amount of the air conditioning unit based on the number of the currently occupied spaces and a maximum energy consumption amount of each of the plurality of air conditioning terminal devices.

According to some embodiments of the present disclosure, said determining the current energy consumption amount of each of the plurality of air conditioning units may include: determining an operation state of an air conditioning terminal device of a currently occupied space in the plurality of spaces, a current temperature of the occupied space, a predetermined temperature of the air conditioning terminal device, and a temperature change rate in the occupied space; and determining the current energy consumption amount of the air conditioning unit by determining an energy consumption amount of an air conditioning terminal device of each currently occupied space based on the operation state, the current temperature, the predetermined temperature, and the temperature change rate.

According to some embodiments of the present disclosure, said determining the energy consumption amount of the air conditioning terminal device of each currently occupied space based on the operation state, the current temperature, the predetermined temperature, and the temperature change rate may include: determining, in accordance with a determination that the operation state of the air conditioning terminal device is in an off-state, the energy consumption amount of the air conditioning terminal device in the space based on a temperature difference between the predetermined temperature and the current temperature; and determining, in accordance with a determination that the operation state of the air conditioning terminal device is in an on-state, the energy consumption amount of the air conditioning terminal device in the space based on the temperature change rate and the temperature difference. The temperature difference is positively correlated with the energy consumption amount. The temperature change rate includes a temperature deviation change rate and a temperature approaching change rate. The temperature deviation change rate is in negative correlation with the energy consumption amount, and the temperature approaching change rate is positively correlated with the energy consumption amount. The temperature deviation change rate refers to a change rate at which the current temperature is changing away from the predetermined temperature, and the temperature approaching change rate refers to a change rate at which the current temperature is changing close to the predetermined temperature.

According to some embodiments of the present disclosure, said determining the energy consumption amount of the air conditioning terminal device of each currently occupied space based on the operation state, the current temperature, the predetermined temperature, and the temperature change rate may include: classifying the energy consumption amount of the air conditioning terminal device into different grades based on the operation state, the current temperature, the predetermined temperature, and the temperature change rate; and determining the energy consumption amount of the air conditioning terminal device based on an energy consumption amount corresponding to each grade.

According to some embodiments of the present disclosure, said determining the candidate space based on the current energy consumption amount may include: determining the candidate space based on a deviation value between the current energy consumption amount of each of the plurality of air conditioning units and a predetermined preferred energy consumption range.

According to some embodiments of the present disclosure, said determining the candidate space based on the deviation value between the current energy consumption amount of each of the plurality of air conditioning units and the predetermined preferred energy consumption range may include: determining, in response to the current energy consumption amount of the air conditioning unit being smaller than a lower limit value of the predetermined preferred energy consumption range, a space corresponding to the air conditioning unit as the candidate space when a difference of the current energy consumption amount of the air conditioning unit subtracted from the lower limit value of the predetermined preferred energy consumption range is smaller than or equal to a maximum energy consumption amount of a single air conditioning terminal device; and determining, in response to the current energy consumption amount of the air conditioning unit being greater than the lower limit value of the predetermined preferred energy consumption range and being smaller than an upper limit value of the predetermined preferred energy consumption range, the space corresponding to the air conditioning unit as the candidate space when a difference of the current energy consumption amount of the air conditioning unit subtracted from the upper limit value of the predetermined preferred energy consumption range is greater than or equal to the maximum energy consumption amount of the single air conditioning terminal device.

According to some embodiments of the present disclosure, said recommending the available space based on the demand information and the candidate space may include: determining one or more priority levels of one or more unoccupied spaces in the candidate space; and determining the available space from the unoccupied spaces based on the demand information in accordance with the priority levels of the unoccupied spaces.

According to some embodiments of the present disclosure, the priority levels of the unoccupied spaces in the candidate space may be determined by one or more of: determining priority levels of the unoccupied spaces from high to low based on a deviation value between a current temperature of each unoccupied space and a predetermined temperature from small to great; and determining the priority levels of the unoccupied spaces from high to low based on a distance of each unoccupied space from an occupied space from near to far.

According to some embodiments of the present disclosure, said determining the available space from the unoccupied spaces based on the demand information in accordance with the priority levels of the unoccupied spaces may include: updating the priority levels of the unoccupied spaces based on a matching degree between space configuration information of the unoccupied spaces and the demand information; and determining the available space from the unoccupied spaces based on the updated priority levels of the unoccupied spaces.

According to some embodiments of the present disclosure, in a case where the demand information includes a number of spaces expected to be used, said determining the available space from the unoccupied spaces based on the demand information in accordance with the priority levels of the unoccupied spaces may further include: determining the available space from the unoccupied spaces based on the number of spaces expected to be used in accordance with the priority levels of the unoccupied spaces.

According to some embodiments of the present disclosure, the space is a hotel room, the user space usage request may include a check-in request of the user for the hotel room, and the demand information may include a desired number of rooms and a usage time, and a desired hardware configuration condition of the user for the hotel room.

According to some embodiments of the present disclosure, said recommending the available space based on the demand information and the candidate space may include: comparing the demand information with space configuration information of an unoccupied space in the candidate space; and determining the available space from spaces beyond the candidate space when no space having space configuration information matching with the demand information is in the candidate space.

According to other embodiments of the present disclosure, provided is a space recommendation device based on an air conditioning system. The air conditioning system may include a plurality of air conditioning units. Each of the plurality of air conditioning units may include a plurality of air conditioning terminal devices. The plurality of air conditioning terminal devices is respectively arranged in a plurality of spaces. The space recommendation device based on the air conditioning system may include: an obtaining unit configured to obtain a user space usage request, where the user space usage request carries demand information of a user for a space; an energy consumption determination unit configured to determine a current energy consumption amount of each of the plurality of air conditioning units; a space determination unit configured to determine a candidate space based on the current energy consumption amount; and a recommendation unit configured to recommend an available space based on the demand information and the candidate space.

According to yet other embodiments of the present disclosure, provided is a space recommendation system. The space recommendation system may include a space management terminal and an air conditioning system. The air conditioning system may include a plurality of air conditioning units. Each of the plurality of air conditioning units may include a plurality of air conditioning terminal devices. The plurality of air conditioning terminal devices is respectively arranged in a plurality of spaces; the space management terminal may be configured to obtain a user space usage request, where the user space usage request carries demand information of a user for a space, the air conditioning system may be configured to determine a current energy consumption amount of each of the plurality of air conditioning units and transmit the current energy consumption amount to the space management terminal; and the space management terminal may be configured to determine a candidate space based on the current energy consumption amount and recommend an available space based on the demand information and the candidate space.

According to some more embodiments of the present disclosure, provided is a computer-readable storage medium. The computer-readable storage medium has a computer program stored thereon. The computer program, when executed by a processor, implements the method for space recommendation based on the air conditioning system as described in the first aspect.

With the space recommendation method, device, and system based on the air conditioning system, and the storage medium according to some embodiments of the present disclosure, the user demand may be matched with the optimization of the energy consumption of the air conditioning system, and the energy-saving and cost-reducing purpose may be attained.

In some embodiments, with the space recommendation method, device, and system based on the air conditioning system, and the storage medium according to the present disclosure, the current energy consumption amount of the air conditioning system may be determined based on a real-time operation state and real-time temperature information of the air conditioning system. Therefore, in some embodiments, a more accurate energy consumption amount calculation result may be obtained, to perform available space recommendation more precisely.

In some embodiments, with the space recommendation method, device, and system based on the air conditioning system, and the storage medium according to some embodiments of the present disclosure, a space beneficial to optimization of an energy-saving effect of the air conditioning system may be screened out from the plurality of spaces. Therefore, in some embodiments, it may be possible to narrow a range of a space used for determining the available space, and may increase a calculation speed of space recommendation.

In some embodiments, with the space recommendation method, device, and system based on the air conditioning system, and the storage medium according to the present disclosure, an available space satisfying the user demand may be selected from the unoccupied spaces. Therefore, in some embodiments, the user preference may be accurately matched while the optimization of the energy-saving effect of the air conditioning system may be achieved.

BRIEF DESCRIPTION OF THE DRAWINGS

The above and/or additional embodiments of the present disclosure will become apparent and readily understood from the following description of embodiments in conjunction with the accompanying drawings. It should be understood that the following drawings illustrate only some embodiments of the present disclosure and therefore should not be construed as limiting the scope of the present disclosure. Based on these drawings, other drawings can be obtained by those of ordinary skill in the art without creative effort, in which.

DETAILED DESCRIPTION

Figures 1, 2:
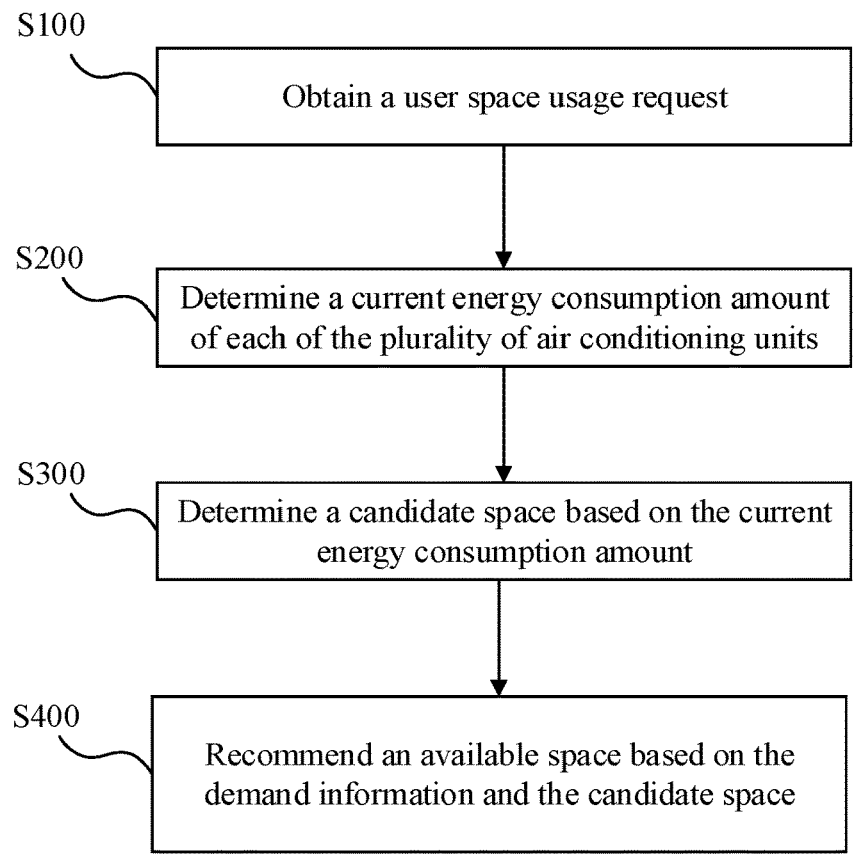
FIG. 1 illustrates a schematic flowchart of a method for space recommendation based on an air conditioning system according to some embodiments of the present disclosure.
FIG. 2 illustrates a schematic diagram of a plurality of space distribution structures according to some embodiments of the present disclosure.

Embodiments of the present disclosure will be described in detail below with reference to examples thereof as illustrated in the accompanying drawings, throughout which same or similar elements, or elements having same or similar functions, are denoted by same or similar reference numerals. The embodiments described below with reference to the drawings are illustrative merely, and are intended to explain, rather than to limit the present disclosure.

It should be noted herein that the "space" in the context of the present disclosure may refer to a three-dimensional space in a physical place such as a building or a structure. The space may be a unit space/region in an overall space (e.g., a relatively large space). For example, the space may be a compartment or unit separated by a wall or wooden partition. In an application scenario of a hotel, the space may be a hotel room; in an application scenario of an office building, the space may be an office or a cubicle; and in an application scenario of a sports venue, the space may be a regional sports ground, such as a basketball court or a badminton court in a gymnasium. The space described in the embodiments of the present disclosure is not limited to the above-mentioned application scenarios. For example, the space may also be any service site like a restaurant or a café. It should be further noted that a "user space usage request" in the context of the present disclosure may vary depending on different application scenarios of the present disclosure. For example, in the application scenario of hotel, the user space usage request may be a request for reserving a hotel room; in the application scenario of office building, the user space usage request may be a request for reserving an office or a cubicle; in the application scenario of sports venue, the user space usage request may be a request for reserving a regional sports ground.

Although the following uses the application scenario of the hotel as an example for description, it should be understood that the space recommendation method, device, and system according to the embodiments of the present disclosure are not limited thereto and may also be applied in any other scenario involving multi-space recommendation.

It should also be noted that an air conditioning system given below may be an air conditioning system such as a multi-split air conditioning system, a water-cooled air conditioning system, or other central air conditioning systems including a plurality of air conditioning terminal devices. The air conditioning terminal device may refer to an indoor unit, an air supply outlet, or the like, arranged in a space, but is not limited thereto. The air conditioning terminal may be an element, a component, an apparatus, or a device mounted in the space for providing an air conditioning function.

A space recommendation method, device, and system based on an air conditioning system, and a computer-readable storage medium according to the embodiments of the present disclosure are described below with reference to the accompanying drawings.

It should be noted that, before the present disclosure is proposed, only an unoccupied space is considered in an allocation method for a plurality of spaces. Moreover, an available space may be selected in the unoccupied space as user demand, and an energy consumption condition of the air conditioning system mounted in the space is not considered. Therefore, optimization of an energy-saving effect of the air conditioning system may be not optimal.

In some embodiments, the air conditioning system may include a plurality of air conditioning units. Each of the plurality of air conditioning units may include a plurality of air conditioning terminal devices respectively arranged in each of a plurality of spaces. Operation energy consumption of each air conditioning unit may be energy-saving and efficient within a preferred energy consumption range. Moreover, a service life of the air conditioning terminal device may be prolonged. However, in an existing space recommendation method, space recommendation is performed without considering operation energy consumption of the air conditioning system. It is possible that a recommended space makes the operation energy consumption of one air conditioning unit outside the preferred energy consumption range, or even exceed a preferred energy consumption threshold, resulting in operation of the air conditioning unit at near-maximum energy consumption. Therefore, a great loss of hardware of the air conditioning unit itself is caused. Alternatively, in a case where the plurality of air conditioning units is provided, it may unnecessarily open a set of new air conditioning units, causing a phenomenon of wasting energy consumption.

The present disclosure provides a method for space recommendation based on an air conditioning system. FIG. 1 illustrates a schematic flowchart of a method for space recommendation based on an air conditioning system according to some embodiments of the present disclosure. FIG. 2 illustrates a schematic diagram of a plurality of space distribution structures according to some embodiments of the present disclosure.

The method for space recommendation based on the air conditioning system according to some embodiments of the present disclosure will be described in detail below with reference to FIG. 1 and FIG. 2. In some embodiments of the present disclosure, the air conditioning system may include a plurality of air conditioning units. Each of the plurality of air conditioning units may include a plurality of air conditioning terminal devices. The plurality of air conditioning terminal devices is arranged in a plurality of spaces, to respectively perform air conditioning adjustment on each of the plurality of spaces. As an example, the air conditioning unit may be the multi-split air conditioning system or the water-cooled air conditioning system. The air conditioning terminal device may be a device mounted in each space, such as an indoor unit and an air supply outlet. An execution body of the method for space recommendation based on the air conditioning system described below may be, for example, a hotel room management system mounted on a hotel server or a terminal device, or a cloud platform system executed on a cloud server. However, the present disclosure does not especially limit this execution body, which may be any hardware or software that may perform the space recommendation method according to some embodiments of the present disclosure. The hotel room management system may, for example, be loaded in a space management terminal provided in the hotel as described below.

The method for space recommendation based on the air conditioning system according to some embodiments of the present disclosure may include blocks 100 to 200.

At block S100, a user space usage request is obtained, the user space usage request carrying demand information of a user for a space.

At this block, the user space usage request may be information of a space usage request provided by the user, which may carry the demand information of the user for the space. The demand information may refer to user's configuration demand for a required space. For example, the demand information, which may include, but is not limited to, a number of spaces expected to be used, a space usage time, a desired space configuration condition, or the like, may be inputted through a user terminal or a terminal device of a space recommendation system.

In the application scenario of the hotel, the space is the hotel room, the user space usage request may include a check-in request of the user for the hotel room, and the demand information may include a desired number of rooms and a usage time, and a desired hardware configuration condition of the user for the hotel room. The desired number of rooms for the hotel room may be a number of hotel rooms booked. The usage time for the hotel room may be a required check-in time or an arrival time for the room. The desired hardware configuration condition may include preferences for the space, like selection for a space with a window, a high or low floor, away from the elevator, or a specific orientation. As an example, in a case where the hotel room is booked over a network, a hotel room reservation system of a hotel may be accessed via a mobile communication terminal or a personal computer, to input the demand information or select the demand information from existing options. In this case, the demand information may include a check-in time, a room type (e.g., a room size, number and size of beds in a room, window availability), and floor preference. In a case on-site room selection after customers' arrival, hotel staff may input the demand information or select the demand information from the existing options by operating the hotel room management system based on checked-in persons' demand. In such case, the demand information may include the room type (e.g., room size, number and size of beds, window availability), and floor preference. The hotel room management system may regard the time for inputting the demand information as the check-in time by default.

In addition, the "user" in some embodiments of the present disclosure may refer to a user who needs to use the space, or an operator who operates hardware or software to perform the space recommendation method according to some embodiments of the present disclosure. In the application scenario of the hotel, the "user" may be a checked-in guest or a hotel staff.

At block S200, a current energy consumption amount of each of the plurality of air conditioning units is determined.

In this block, the current energy consumption amount of the air conditioning unit may be determined by a static condition or a dynamic condition.

In an example, determining the current energy consumption amount of the air conditioning unit by the static condition may refer to estimating the current energy consumption amount of the air conditioning unit based on known space usage information and inherent characteristics of the air conditioning system. In this case, the current energy consumption amount of the air conditioning unit may be estimated through the hotel room management system. In addition, space occupation information from the hotel room management system may also be received through an air conditioning data analysis system of the air conditioning system. The current energy consumption amount of the air conditioning system is estimated according to the space occupation information, and is transmitted to the hotel room management system. Here, the air conditioning system may include a network device. The network device may be used for communication between the air conditioning data analysis system and the hotel room management system. The air conditioning data analysis system may be a control system for the air conditioning system, and may be arranged on a terminal device for controlling operation of the air conditioning system or integrated in a cloud platform for controlling the air conditioning system.

In some embodiments, the determining the current energy consumption amount of each of the plurality of air conditioning units may include blocks S211 and S212. At block S211, a number of spaces currently occupied in a space corresponding to the air conditioning unit is obtained; and at block S212, the current energy consumption amount of the air conditioning unit is determined based on the number of the currently occupied spaces and a maximum energy consumption amount of each of the plurality of air conditioning terminal devices.

At block S211, the number of currently occupied spaces may be obtained by means of information for reserved spaces and information for used spaces. For example, in the application scenario of the hotel, the hotel room management system may retrieve information about a hotel room that has been reserved and information about a hotel room that has been checked in, and obtain the number of currently occupied spaces in the plurality of spaces, to determine a number of air conditioning terminal devices in the currently occupied hotel rooms of each air conditioning unit.

At block S212, the maximum energy consumption amount of each of the plurality of air conditioning terminal devices may be determined. The maximum energy consumption amount may be pre-stored. For example, the maximum energy consumption amount may be a known inherent parameter when the air conditioning system leaves a factory or comes into service.

In this example, a product of the number of currently occupied spaces and the maximum energy consumption amount of each of the plurality of air conditioning terminal devices may be determined as the current energy consumption amount of the air conditioning unit, to perform space recommendation based on the current energy consumption amount.

As an example, it is assumed that an air conditioning unit includes n air conditioning terminal devices. The n air conditioning terminal devices are correspondingly arranged in n spaces. After determining that one of the n spaces has been used or booked by the user, no matter whether an air conditioning terminal device in the space is turned on, it may all be considered that 1/n of the total maximum energy consumption amount of the air conditioning unit will be occupied. Therefore, the product of the number of currently occupied spaces and the maximum energy consumption amount may be determined as the current energy consumption amount of the air conditioning unit.

In another example, determining the current energy consumption amount of the air conditioning unit through the dynamic condition may refer to determining the current energy consumption amount of the air conditioning unit based on real-time operation information of the air conditioning system. In this case, the current energy consumption amount of the air conditioning unit may be calculated by the air conditioning data analysis system of the air conditioning system. Moreover, the execution body of the hotel room management system may determine the current energy consumption amount of the air conditioning system by receiving a calculation result transmitted from the air conditioning system.

In some embodiments, the determining the current energy consumption amount of each of the air conditioning units may include blocks S221 and S222.

At block S221, an operation state of an air conditioning terminal device of a currently occupied space in a space corresponding to the air conditioning unit, a current temperature of the occupied space, a predetermined temperature of the air conditioning terminal device, and a temperature change rate in the occupied space are determined.

In this block, the operation state of the air conditioning terminal device may include an on-state and an off-state.

The current temperature of the occupied space may be detected by an indoor temperature sensor of the air conditioning terminal device, or may be obtained from other electronic devices sensing an indoor temperature in the space.

The predetermined temperature of the air conditioning terminal device may be a desired temperature predetermined by the user, which may be provided by the air conditioning terminal device, for example, to the hotel room management system.

The temperature change rate in the occupied space may be an amount of variation of the indoor temperature within the space per unit time, which may be determined by the current temperature of the occupied space and a temperature collected at a prior moment.

At block S222, the current energy consumption amount of the air conditioning unit is determined by determining an energy consumption amount of an air conditioning terminal device of each currently occupied space based on the operation state, the current temperature, the predetermined temperature, and the temperature change rate.

As an example, in a case where the operation state of the air conditioning terminal device is in an off-state, the energy consumption amount of the air conditioning terminal device in the space may be determined based on a temperature difference between the predetermined temperature and the current temperature. In a case where the operation state of the air conditioning terminal device is in an on-state, the energy consumption amount of the air conditioning terminal device in the space may be determined based on the temperature change rate and the temperature difference.

In some embodiments, the temperature difference between the predetermined temperature and the current temperature may be positively correlated with the energy consumption amount of the air conditioning terminal device. When the temperature difference is increased, the energy consumption amount of the air conditioning terminal device is increased; and when the temperature difference is reduced, the energy consumption amount of the air conditioning terminal device is reduced.

The temperature change rate may include a temperature deviation change rate and a temperature approaching change rate. The temperature deviation change rate refers to a change rate at which the current temperature is changing away from the predetermined temperature, and the temperature approaching change rate refers to a change rate at which the current temperature is changing close to the predetermined temperature.

The temperature deviation change rate may be in negative correlation with the energy consumption amount, i.e., when the temperature deviation change rate is increased, the energy consumption amount of the air conditioning terminal device is decreased; and when the temperature deviation change rate is decreased, the energy consumption amount of the air conditioning terminal device is increased.

The temperature approaching change rate may be positively correlated with the energy consumption amount, e.g., when the temperature approaching change rate is increased, the energy consumption amount of the air conditioning terminal device is increased; and when the temperature approaching change rate is decreased, the energy consumption amount of the air conditioning terminal device is decreased.

As another example, the energy consumption amount of the air conditioning terminal device may be classified into different grades based on the operation state, the predetermined temperature, and the temperature change rate, and the energy consumption amount of the air conditioning terminal device is determined based on an energy consumption amount corresponding to each grade, to determine the current energy consumption amount of the whole air conditioning unit. For example, multi-grade energy consumption may be set for the air conditioning terminal device, and each grade corresponds to a fixed energy consumption amount. An exemplary classification for an energy consumption grade is specifically described below.

At first-grade energy consumption, when the air conditioning terminal device in the space is in the off-state and the temperature difference between the predetermined temperature and the current temperature is great, for example, the temperature difference is greater than a predetermined difference, an energy consumption amount prediction requirement may be a maximum energy consumption amount of a single air conditioning terminal device, for example, may be 20% of a total maximum energy consumption amount of the air conditioning unit. The predetermined difference herein may be, for example, 2° C., but is not limited thereto, which may be set as desired.

When the air conditioning terminal device is in the on-state, and the temperature deviation change rate is high, for example, the temperature deviation change rate is higher than a predetermined change rate, and the temperature difference between the predetermined temperature and the current temperature is great, for example, the temperature difference is greater than the predetermined difference, the energy consumption amount prediction requirement may be the maximum energy consumption amount of the single air conditioning terminal device, for example, may be 20% of the total maximum energy consumption amount of the air conditioning unit. The predetermined change rate herein may be, for example, 0.2° C./min, but it is not limited thereto, which may be set as desired.

At second-grade energy consumption, when the air conditioning terminal device in the space is in the off-state and the temperature difference between the predetermined temperature and the current temperature is small, for example, the temperature difference is smaller than the predetermined difference, and the energy consumption amount prediction requirement may be smaller than the maximum energy consumption amount of the single air conditioning terminal device, for example, may be 15% of the total maximum energy consumption amount of the air conditioning unit.

When the air conditioning terminal device is in the on-state, and the temperature approaching change rate is low, for example, the temperature approaching change rate is lower than or equal to the predetermined change rate, and the temperature difference between the predetermined temperature and the current temperature is great, for example, the temperature difference is greater than the predetermined difference, the energy consumption amount prediction requirement may be smaller than the maximum energy consumption amount of the single air conditioning terminal device and greater than half of the maximum energy consumption amount, for example, may be 15% of the total maximum energy consumption amount of the air conditioning unit.

When the air conditioning terminal device is in the on-state, and the temperature deviation change rate is low, for example, the temperature deviation change rate is lower than or equal to the predetermined change rate, and the temperature difference between the predetermined temperature and the current temperature is great, for example, the temperature difference is greater than the predetermined difference, the energy consumption amount prediction requirement may be smaller than the maximum energy consumption amount of the single air conditioning terminal device and greater than the half of the maximum energy consumption amount, for example, may be 15% of the total maximum energy consumption amount of the air conditioning unit.

At third-grade energy consumption, when the air conditioning terminal device is in the on-state, and the temperature approaching change rate of the space is high, for example, the temperature approaching change rate is higher than the predetermined change rate, and the temperature difference between the predetermined temperature and the current temperature is great, for example, the temperature difference is greater than the predetermined difference, the energy consumption amount prediction requirement may be the half of the maximum energy consumption amount of the single air conditioning terminal device, for example, may be 10% of the total maximum energy consumption amount of the air conditioning unit.

When the air conditioning terminal device is in the on-state, and the temperature deviation change rate of the space is high, for example, the temperature deviation change rate is higher than the predetermined change rate, and the temperature difference between the predetermined temperature and the current temperature is small, for example, the temperature difference is smaller than the predetermined difference, the energy consumption amount prediction requirement may be the half of the maximum energy consumption amount of the single air conditioning terminal device, for example, may be 10% of the total maximum energy consumption amount of the air conditioning unit.

At fourth-grade energy consumption, when the air conditioning terminal device is in the on-state, and the temperature approaching change rate of the space is small, for example, the temperature approaching change rate is lower than or equal the predetermined change rate, and the temperature difference between the predetermined temperature and the current temperature is small, for example, the temperature difference is smaller than the predetermined difference, the energy consumption amount prediction requirement may be a quarter of the maximum energy consumption amount of the single air conditioning terminal device, for example, may be 5% of the total maximum energy consumption amount of the air conditioning unit.

When the air conditioning terminal device is in the on-state, and the temperature deviation change rate of the space is low, for example, the temperature deviation change rate is lower than or equal to the predetermined change rate, and the temperature difference between the predetermined temperature and the current temperature is small, for example, the temperature difference is smaller than the predetermined difference, the energy consumption amount prediction requirement may be the quarter of the maximum energy consumption amount of the single air conditioning terminal device, for example, may be 5% of the total maximum energy consumption amount of the air conditioning unit.

At fifth-grade energy consumption, when the air conditioning terminal device in the space is in the on-state, and the temperature approaching change rate of the space is high, for example, the temperature approaching change rate is higher than the predetermined change rate, and the temperature difference between the predetermined temperature and the current temperature is small, for example, the temperature difference is smaller than the predetermined difference, the energy consumption amount prediction requirement may be smaller than the quarter of the maximum energy consumption amount of the single air conditioning terminal device, for example, may be 1% of the total maximum energy consumption amount of the air conditioning unit.

In a case where the energy consumption amount of the air conditioning terminal device in each of the currently occupied spaces is determined, the energy consumption amounts of the air conditioning terminal devices in all the occupied spaces may be added to determine the current energy consumption amount of the air conditioning unit.

In yet another example, prediction of the current energy consumption amount of the air conditioning unit may be determined based on an air conditioning's own unit capability, a temperature rise and drop effect, an air conditioning predetermined state, an optional ambient temperature, and predetermination for construction energy consumption.

Returning to FIG. 1, at block S300, a candidate space is determined based on the current energy consumption amount.

In this block, the candidate space may be determined based on a deviation value between the current energy consumption amount of each of the plurality of air conditioning units and a predetermined preferred energy consumption range. The predetermined preferred energy consumption range may be an energy consumption range allowing for energy-saving operation of the air conditioning unit. The deviation value may refer to a difference between the current energy consumption amount and an upper limit value or a lower limit value of the predetermined preferred energy consumption range. The candidate space may refer to a space that may be used for comparing with the demand information in the user space usage request.

In some embodiments, in response to the current energy consumption amount of the air conditioning unit being smaller than a lower limit value of the predetermined preferred energy consumption range, a space corresponding to the air conditioning unit may be determined as the candidate space when a difference of the current energy consumption amount of the air conditioning unit subtracted from the lower limit value of the predetermined preferred energy consumption range is smaller than or equal to a maximum energy consumption amount of a single air conditioning terminal device.

In response to the current energy consumption amount of the air conditioning unit being greater than the lower limit value of the predetermined preferred energy consumption range and being smaller than an upper limit value of the predetermined preferred energy consumption range, the space corresponding to the air conditioning unit may be determined as the candidate space when a difference of the current energy consumption amount of the air conditioning unit subtracted from the upper limit value of the predetermined preferred energy consumption range is greater than or equal to the maximum energy consumption amount of the single air conditioning terminal device.

In an example, a space group may be formed in a plurality of spaces where a plurality of air conditioning terminal devices belonging to a same air conditioning unit is located. For example, in the application scenario of the hotel, the space group may be composed of a plurality of rooms located on a same floor. In this example, a candidate space group may be determined based on the current energy consumption amount of the air conditioning unit. Moreover, an unoccupied space in the determined candidate space group is used as the candidate space.

In another example, the candidate space may be, after the air conditioning unit satisfying a deviation value condition of the predetermined preferred energy consumption range is determined, a candidate space determined by determining a space corresponding to an unoccupied air conditioning terminal device in the air conditioning unit satisfying the condition.

As an example, the predetermined preferred energy consumption range of the air conditioning unit may be in a range of 40% to 80% of the maximum energy consumption amount. The maximum energy consumption amount of the single air conditioning terminal device may be 20% of the maximum energy consumption amount of the air conditioning unit. In a case where the current energy consumption amount is 20% of the maximum energy consumption amount of the air conditioning unit, when a space is selected from the space corresponding to the air conditioning unit for use, the energy consumption amount of the air conditioning unit is increased by up to 40%. Therefore, it can be ensured that the air conditioning unit operates within the predetermined preferred energy consumption range. In a case where the current energy consumption is 40% of the maximum energy consumption amount of the air conditioning unit, when a space is selected from the space corresponding to the air conditioning unit for use, the energy consumption amount of the air conditioning unit is increased by up to 60%. Therefore, it can still be ensured that the air conditioning unit operates within the predetermined preferred energy consumption range.

Returning to FIG. 1, at block S400, an available space is recommended based on the demand information and the candidate space.

In this block, the available space may be determined based on the demand information and the candidate space as a predetermined control strategy.

In one case, the predetermined control strategy may be an energy consumption priority strategy for the air conditioning system.

The energy consumption priority strategy for the air conditioning system may refer to selecting an available space satisfying the demand information in the user space usage request in a case where the energy consumption amount of the air conditioning unit is ensured to be within the predetermined preferred energy consumption range or to not exceed a predetermined energy consumption threshold. In some embodiments, the available space may be recommended from the candidate space based on the demand information. For example, the available space recommended to the user may be determined.

For example, taking a three-story hotel as an example, rooms 101 to 105 on the first floor and rooms 201 to 202 on the second floor share a set of multi-split or water-cooled air conditioning units M, with a total of 7 corresponding indoor units. Rooms 203 to 205 on the second floor and rooms 301 to 305 on the third floor share another set of multi-split or water-cooled air conditioning unit N. It is assumed that each room's air conditioning unit has a same cooling capacity.

The hotel room management system may initially retrieve an occupancy state for the day, revealing that rooms 204, 205, and 301 are occupied. This check-in information may be relayed by the hotel room management system to an air conditioning operation data analysis system for the air conditioning system. The air conditioning operation data analysis system for the air conditioning system may analyze and determine that maximum operation energy consumption for an air conditioning unit N is 42.8% of its total capacity and maximum operation energy consumption for an air conditioning unit M is 0. Based on this, the air conditioning operation data analysis system for the air conditioning system analyzes energy consumption usage of the air conditioning system and calculates an energy consumption ratio of efficient operation of the plurality of air conditioning units. Therefore, rooms 203, 302 to 305 are available for use.

In this way, upon receiving a user's hotel room reservation request, available rooms 203, 302 to 305 may be displayed in a user-selectable room list based on the air conditioning energy consumption priority strategy. The user will only be able to choose from the available rooms 203, 302 to 305, regardless of their demand information.

In the above example, all unoccupied spaces in the candidate space may be provided as the available space to the user. In another example, once the candidate space is determined, an available room may also be recommended according to one or more priority levels of one or more unoccupied spaces in the candidate space. For example, all unoccupied spaces in the candidate space may be partially provided as the available space to the user.

In some embodiments, the block of determining the available space from the candidate space may include blocks S401 and S402.

At block S401, one or more priority levels of one or more unoccupied spaces in the candidate space are determined; at block S402, the available space is determined from the unoccupied spaces based on the demand information in accordance with the priority levels of the unoccupied spaces.

In this block, the priority levels of the unoccupied spaces may refer to a priority order in which one or more unoccupied spaces are provided to the user for selection, and a space with high priority level may be preferentially recommended to the user as the available space.

The priority levels of the unoccupied spaces in the candidate space may be determined by space configuration information of the unoccupied spaces in the candidate space. The space configuration information may include physical space location information (such as adjacency to different spaces in terms of up, down, left, and right, a height of the space relative to the ground, or orientation of the space), space construction information (like a space size, a space height, or whether the space has windows) and space environment information (e.g., a current temperature within the space).

As an example, the priority levels of the unoccupied spaces in the candidate space are determined by one or more of:

(1) A priority levels of the unoccupied spaces from high to low are determined based on a deviation value between a current temperature of each unoccupied space and a predetermined temperature from small to great.

In some embodiments, the current temperature of the unoccupied space may be obtained. For example, the indoor temperature of the space may be obtained from the temperature sensor of the air conditioning terminal device in the corresponding space, and the current temperature may be compared with the predetermined temperature. The predetermined temperature may be the temperature at which the user uses a high frequency, which may be obtained by counting historical data of temperature set values of all the air conditioning terminal devices. For example, the predetermined temperature may be the most frequently used temperature among all historical data of the air conditioning terminal devices. As an example, the predetermined temperature may be a comfortable temperature for the human body, such as 26° C. The smaller the difference between the current temperature and the predetermined temperature in the space, it may be considered that the smaller the energy consumption is expected for the air conditioning terminal device to adjust the indoor temperature to the predetermined temperature after the user uses the space. Therefore, a space with small difference can be preferentially recommended to the user.

For example, as illustrated in FIG. 2, in the hotel application scenario, three floors A, B, and C are provided, each with five rooms. It is assumed that rooms B1, B2, B3, B4, and B5 and rooms C1, C2, C3, C4, and C5 are unoccupied, and current temperatures of the rooms B1 to B5 and C1 to C5 are all obtained. For example, the current temperatures of the rooms B1 to B5 are all 27° C., and the current temperatures of the rooms C1 to C5 are all 29° C., so the predetermined temperature may be 26° C. Therefore, a temperature difference between the current temperatures of the rooms B1 to B5 and the predetermined temperature is smaller than a temperature difference between the current temperatures of the rooms C1 to C5 and the predetermined temperature. In this case, priority levels of rooms B1 to B5 will be higher than priority levels of rooms C1 to C5. Consequently, after all the rooms A1 to A5 are allocated, or when a number of the rooms required by the user cannot be fulfilled in floor A, the rooms B1 to B5 on floor B will be preferentially recommended.

(2) The priority levels of the unoccupied spaces from high to low are determined based on a distance of each unoccupied space from an occupied space from near to far.

In some embodiments, since a thermal conduction phenomenon and/or thermal convection phenomenon occurs between different spaces, a temperature of a space located around the occupied space may be affected by the temperature of the occupied space. Therefore, the priority levels of the unoccupied spaces may be determined by considering thermal conduction effects and thermal convection effects between relative positional relationships of the plurality of spaces. For example, the priority levels of the unoccupied spaces from high to low may be determined according to a physical straight-line distance from the occupied space from short to long.

For example, still referring to the example of FIG. 2, in the application scenario of the hotel, room A3 may be the occupied room, in which case temperatures of rooms A2 and A4 adjacent to room A3 may be most affected by a temperature of the room A3. Therefore, rooms A2 and A4 may have the highest priority level. In addition, temperatures of rooms A1 and A5 adjacent to the rooms A2 and A4 may also be affected by the temperature of the room A3. Therefore, rooms A1 and A5 may have a sub-highest priority level.

In addition, in a case where the air conditioning unit on the floor A has reached 80% of the maximum energy consumption amount, the available room may be chosen from rooms on the floor B. In this case, except for the rooms A1, A2, A4, and A5, room B3, having a shortest physical straight-line distance from the occupied room A3, may have a medium priority level next to a priority level of room A1 and a priority level of room A5. Therefore, the room B3 may be allocated as the available room to the use after the rooms A1, A2, A4, and A5. In addition, rooms B2 and B4 may have a sub-medium priority level based on an increasing order of the physical straight distances from the occupied rooms A3. The priorities of other rooms may be arranged following the same principle, and details are omitted herein.

Returning to block S402, the space satisfying the demand information may be selected as the available space as a descending order of the priority levels of the unoccupied spaces.

As an example, the determining the available space from the unoccupied spaces based on the demand information in accordance with the priority levels of the unoccupied spaces may include: updating the priority levels of the unoccupied spaces based on a matching degree between space configuration information of each unoccupied space and the demand information; and determining the available space from the unoccupied spaces based on the updated priority levels of the unoccupied spaces.

In this block, the space configuration information may be information of a type corresponding to the demand information in the user space usage request. As described above, the space configuration information may include the physical space location information (such as the adjacency to different spaces in terms of up, down, left, and right, the height of the space relative to the ground, or the orientation of the space), the space construction information (like the space size, the space height, or whether the space has windows), and the space environment information (e.g., the current temperature within the space).

The matching degree between space configuration information and the demand information may refer to a degree in which the space configuration information may satisfy the demand information. For example, the demand information may include a desired height h of the space relative to the ground and a height H of the unoccupied space relative to the ground. Moreover, the matching degree may be obtained through an absolute value of a difference between the height h and the height H (i.e., |H−h|), and a matching degree interval may be set for the difference value. For example, when h1≤|H−h|, the matching degree may be 0; when h2≤|H−h|<h1, the matching degree may be 2; and when 0≤|H−h|<h2, the matching degree may be 3, i.e., the closer the absolute value is to 0, the higher the matching degree between the current space and the demand information. Other information in the spatial configuration information is similar to this height information, and all can be used to determine a satisfaction degree of the space configuration information relative to the user demand through a predetermined matching degree rule and express the satisfaction degree as a quantized matching degree.

According to some embodiments of the present disclosure, the matching degree may be used as a weight value of a space priority level to update the priority levels of the unoccupied spaces. For example, the weight value may be added to the existing priority level of the space or multiplied with the priority level to update the priority level of the space.

For example, in the example of FIG. 2, where the room A3 is occupied, the rooms A2 and A4 may have the highest priority level, the rooms A1 and A5 may have a sub-highest priority level, and the rooms A2 and A4 with the highest priority level may only be offered to the user for selection without considering the matching degree of the space configuration information and the demand information. In the case where the matching degree of the space configuration information and the demand information is considered, in accordance with a determination that the demand information indicates the room where the user wants a room with a window, the room A1 is the room having a window, and its matching degree may be 1. The other rooms are all windowless rooms, so their matching degree may be 0. Therefore, the priority level of the room A1 can be increased by one grade, i.e., room A1 has the same highest priority level as rooms A2 and A4, and all three rooms can be offered to the user for selection.

As another example, the demand information may further include a number of spaces expected to be used. In a case where the demand information may further include the number of spaces expected to be used, the determining the available space from the unoccupied spaces based on the demand information in accordance with the priority levels of the unoccupied spaces further may further include: determining the available space from the unoccupied spaces based on the number of spaces expected to be used in accordance with the priority levels of the unoccupied spaces.

In some embodiments, in the case where the number of spaces expected to be used by the user is obtained, according to the priority levels of the unoccupied spaces, the number of spaces that are greater than or equal to the number of spaces expected to be used may be selected from the unoccupied spaces as available spaces for the user in the order of their priority from highest to lowest.

In addition, according to some embodiments of the present disclosure, an energy consumption priority strategy for the air conditioning system may include a static-condition energy consumption priority strategy and a dynamic-condition energy consumption priority strategy.

The static-condition energy consumption priority strategy refers to a scenario where in accordance with a determination that the space is already occupied, regardless of whether the air conditioning terminal equipment is turned on, the air conditioning terminal equipment may all be considered to be in a full-load operation state, i.e., in an operation state of the maximum energy consumption amount of the air conditioning terminal device.

In the static-condition energy consumption priority strategy, the current energy consumption amount of the air conditioning unit may be determined by a static condition, as described above in block S211 and block S212.

For example, it may be considered that the air conditioning terminal device may occupy 20% of the total maximum energy consumption amount of the set of air conditioning units. As an example, a preferred energy consumption range of the air conditioning unit may be 40% to 60% of the total maximum energy consumption amount of the air conditioning unit. When the energy consumption amount of one set of air conditioning units reaches 80%, another set of air conditioning units may be preferentially recommended to be turned on.

For example, as illustrated in FIG. 2, in the hotel application scenario, three floors A, B, and C individually include five rooms, and each floor shares one set of air conditioning units, i.e., three air conditioning units are provided. It is assumed that room A3 is occupied, and the rest of the rooms are vacant. When the demand information carried in the user space usage request indicates the user' demand for reserving one room, the hotel room management system may calculate the current energy consumption amount of the air conditioning unit, i.e., the current energy consumption amount of the air conditioning unit on the floor A is 20% of the total maximum energy consumption amount of the air conditioning unit, and both of a current energy consumption amount of the air conditioning unit on the floor B and a current energy consumption amount of the air conditioning unit on the floor C are 0.

Therefore, in order to ensure energy-efficient operation of the three air conditioning units, the priority levels of the unoccupied spaces should be that rooms A1, A2, A4, and A5 have the highest priority level, and rooms B1 to C5 have the sub-highest priority level. Therefore. The hotel room management system may provide the rooms A1, A2, A4, and A5 as available spaces to the user for choosing from one of them.

The dynamic-condition energy consumption priority strategy refers to determining the current energy consumption amount of the air conditioning unit based on current actual operation energy consumption of the air conditioning unit, and predicting energy consumption of the air conditioning unit at a predetermined moment in the space according to the current energy consumption amount, to determine the available space. The actual operation energy consumption may be directly obtained by actual feedback of outdoor unit operation parameters such as a number of air conditioning terminal devices in operation, an operation mode of the air conditioning terminal device, compressor frequency, and a fan speed, and parameters like an indoor and outdoor temperature or an indoor heat exchanger temperature; may be indirectly obtained through a case where an indoor temperature reaches the predetermined temperature; or may also be obtained in any manner known in the art. The embodiments of the present disclosure are not limited particularly thereto.

Under the dynamic-condition energy consumption priority strategy, the current energy consumption amount of the air conditioning unit may be determined by a dynamic condition, as described above in block S221 and block S222.

For example, in the example of FIG. 2, it is assumed that the occupied rooms are A1 to A3, and the maximum energy consumption should be 60%. However, since users of the rooms A1 and A2 have been staying for some time, the current temperature in the rooms has already decreased. At this time, energy consumption amounts of the air conditioning terminal devices in rooms A1 and A2 are respectively reduced to 5% of the total maximum energy consumption amount of the air conditioning unit. Therefore, comprehensive energy consumption of the rooms A1 to A3 is actually 5%+5%+20%, i.e., 30%. Therefore, the rooms with the highest priority level that can be offered for selection and recommended are rooms A4 and A5.

The dynamic-condition energy consumption priority strategy may determine the current energy consumption amount of the air conditioning unit more accurately. Therefore, the energy-saving effect of the air conditioning unit can be further optimized and considered when the space is allocated.

The above describes that a case where a reservation control strategy may be the air conditioning system energy consumption priority strategy. In another case, the reservation control strategy may be a customer feature priority strategy. The customer feature priority strategy may refer to determining the available space under the condition that the customer feature is satisfied as much as possible.

As an example, the recommending the available space based on the demand information and the candidate space may include: comparing the demand information with space configuration information of an unoccupied space in the candidate space; and determining the available space from spaces beyond the candidate space when no space having space configuration information matching with the demand information is in the candidate space.

For example, taking a three-story hotel as an example, rooms 101 to 105 on the first floor and rooms 201 to 202 on the second floor share one set of air conditioning units M, such as an air conditioning unit of multi-split or water machine system, with a total of 7 indoor units correspondingly. The rooms 203 to 205 on the second floor and the rooms 301 to 305 on the third floor share another set of air conditioning units N, such as an air conditioning unit of multi-split or water machine system. Moreover, it is assumed that each room's air conditioning unit has a same cooling capacity.

The hotel room management system may initially retrieve the occupancy state for the day, revealing that rooms 204, 205, and 301 are occupied. This check-in information may be relayed by the hotel room management system to the air conditioning operation data analysis system for the air conditioning system. The air conditioning operation data analysis system for the air conditioning system may analyze and determine that maximum operation energy consumption for an air conditioning unit N is 42.8% of its total capacity and the maximum operation energy consumption for the air conditioning unit M is 0. Based on this, the air conditioning operation data analysis system for the air conditioning system analyzes the energy consumption usage of the air conditioning system and calculates the energy consumption ratio of efficient operation of the plurality of air conditioning units. Therefore, rooms 203, 302 to 305 are available for use.

Under the customer feature priority strategy, when the user space usage request is received, in a case where it is assumed that the demand information may indicate that the user has a preference for a room on a higher floor near a window, the hotel room management system may preferentially perform room screening based on the demand information and determine that the rooms 302 and 303 satisfy requirements. Then, the hotel room management system may match the screening result with the air conditioning operation data analysis system, to determine that the rooms 302 and 303 can fulfill the energy consumption priority requirement. Therefore, the hotel room management system may recommend rooms 302, 303 as available spaces to the user.

In another case, it is assumed that the demand information may indicate that a room with a window on the first floor is preferred to the user, and it is determined that none of the candidate rooms 203, 302 to 305 recommended based on the current energy consumption amount of the air conditioning unit meet the demand information. In this case, only the demand information of the user may be considered, without considering the energy consumption of the air conditioning unit. Therefore, the preference of the user can be given priority, and rooms 101 to 105 on the first floor with windows, except for the candidate rooms 203, 302 to 305 may be provided and recommended.

Figure 3:
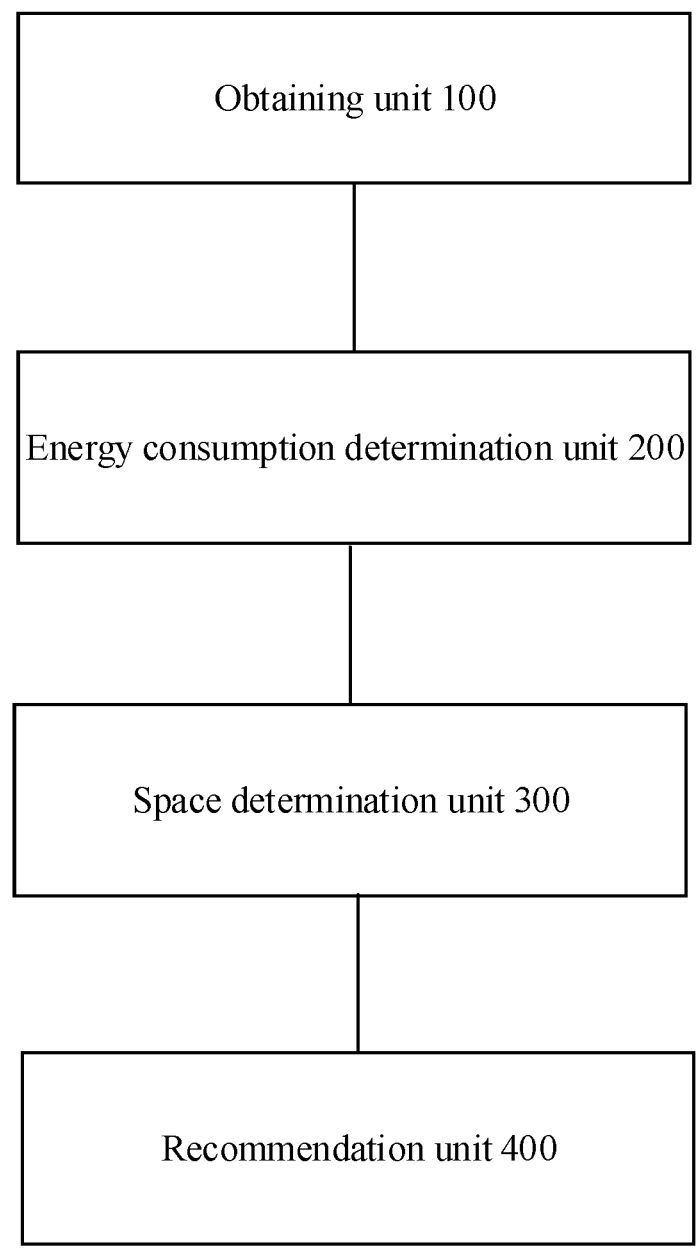
FIG. 3 illustrates a schematic block diagram of a space recommendation device based on an air conditioning system according to some embodiments of the present disclosure.

Based on the same invention concept, some embodiments of the present disclosure further provide a space recommendation device based on an air conditioning system corresponding to the method for space recommendation based on the air conditioning system. FIG. 3 illustrates a schematic block diagram of a space recommendation device based on an air conditioning system according to some embodiments of the present disclosure.

The air conditioning system may include a plurality of air conditioning units. Each of the plurality of air conditioning units may include a plurality of air conditioning terminal devices. The plurality of air conditioning terminal devices may be arranged in a plurality of spaces. As illustrated in FIG. 3, the space recommendation device based on the air conditioning system may include: an obtaining unit 100 configured to obtain a user space usage request, where the user space usage request carries demand information of a user for a space; an energy consumption determination unit 200 configured to determine a current energy consumption amount of each of the plurality of air conditioning units; a space determination unit 300 configured to determine a candidate space based on the current energy consumption amount; and a recommendation unit 400 configured to recommend an available space based on the demand information and the candidate space.

It should be noted that the foregoing explanation of the above embodiments for the method for space recommendation based on the air conditioning system is also applicable to the space recommendation device based on the air conditioning system in this embodiment, and details are not described herein again.

The present disclosure further provides a space recommendation system. The space recommendation system may include a space management terminal and an air conditioning system.

The air conditioning system may include a plurality of air conditioning units. Each of the plurality of air conditioning units may include a plurality of air conditioning terminal devices. The plurality of air conditioning terminal devices may be respectively arranged in a plurality of spaces.

The space management terminal may be configured to obtain a user space usage request, where the user space usage request carries demand information of a user for a space.

The air conditioning system may be configured to determine a current energy consumption amount of each of the plurality of air conditioning units and transmit the current energy consumption amount to the space management terminal.

The space management terminal may be configured to determine a candidate space based on the current energy consumption amount and recommend an available space based on the demand information and the candidate space.

It should be noted that the foregoing explanation of the above embodiments of the method for space recommendation based on the air conditioning system is also applicable to the space recommendation system in this embodiment, for example, the steps in the foregoing method for space recommendation based on the air conditioning system may be executed by a corresponding air conditioning system or a space management terminal, and details are not described herein again.

The present disclosure further provides a computer-readable storage medium, having a computer program stored thereon. The computer program, when executed by a processor, implements the method for space recommendation based on the air conditioning system according to the above method embodiments.

According to the space recommendation method, device, and system based on the air conditioning system and the storage medium, space recommendation may be performed based on the current energy consumption amount of the air conditioning system. Therefore, optimization of user requirements and building air conditioning system cluster energy consumption is effectively matched, and the purposes of energy conservation and consumption reduction is achieved.

In addition, with the space recommendation method, device, and system based on the air conditioning system and the storage medium according to the present disclosure, the current energy consumption amount of the air conditioning system may be determined based on the real-time operation state and the real-time temperature information of the air conditioning system, which can obtain a more accurate energy consumption amount calculation result and perform available space recommendation more precisely.

In addition, with the space recommendation method, device, and system based on the air conditioning system and the storage medium according to the present disclosure, the candidate space may be determined based on the deviation value between the current energy consumption amount and the predetermined preferred energy consumption range. Therefore, the space for optimizing the energy-saving effect of the air conditioning system may be screened out from a plurality of spaces, which can help narrow down the range of spaces used for determining available spaces and increase a calculation speed of space recommendation.

In addition, with the space recommendation method, device and system based on the air conditioning system and the storage medium according to the present disclosure, the priority levels of the unoccupied spaces may be determined, allowing for selection of the available space meeting the user demand from the unoccupied spaces. Therefore, the user preference is accurately matched while the optimization of the energy-saving effect of the air conditioning system is achieved. Moreover, a process of selecting the space satisfying the user demand from a large number of available spaces is saved.

In addition, with the space recommendation method, device and system based on the air conditioning system and the storage medium according to the present disclosure, two priority strategies for space recommendation, i.e., the air conditioning system energy consumption priority strategy and the customer feature priority strategy may be provided. Therefore, the available space can be reasonably recommended to the user in both the case where the candidate space has the space satisfying the demand and the case where the candidate space has no space satisfying the demand.

In the description of this specification, descriptions with reference to the terms "some embodiments", "some embodiments", "examples", "specific examples", or "some examples" etc., mean that specific features, structure, materials or characteristics described in conjunction with the embodiment or example are included in at least one embodiment or example of the present disclosure. In this specification, the schematic representations of the above terms do not necessarily refer to the same embodiment or example. Moreover, the described specific features, structures, materials or characteristics may be combined in any one or N embodiments or examples in a suitable manner. In addition, those skilled in the art can combine the different embodiments or examples and the features of the different embodiments or examples described in this specification without contradicting each other.

In addition, the terms "first" and "second" are only used for descriptive purposes, and cannot be understood as indicating or implying relative importance or implicitly indicating the number of indicated technical features. Therefore, the features associated with "first" and "second" may explicitly or implicitly include at least one of the features. In the description of the present disclosure, "plurality" means at least two, such as two or three, unless otherwise specifically defined.

Any procedure or method described in the flowcharts or described in any other way herein may be understood to include one or more modules, portions or parts of codes of executable instructions that realize actions of particular logic functions or procedures. Moreover, advantageous embodiments of the present disclosure include other implementations in which functions are executed in the order different from which is depicted or discussed, including in a substantially simultaneous manner or in an opposite order according to the related functions, which should be understood by those skilled in the art.

The logic and/or step described in other manners herein or shown in the flowchart, for example, a particular sequence table of executable instructions for realizing the logical function, may be specifically realized in any computer readable medium to be used by the instruction execution system, device or equipment (such as the system based on computers, the system including processors or other systems capable of obtaining the instructions from the instruction execution system, device and equipment and executing the instructions), or to be used in combination with the instruction execution system, device and equipment. As to the specification, "the computer readable medium" may be any device adaptive for including, storing, communicating, propagating or transferring programs to be used by or in combination with the instruction execution system, device or equipment. More specific examples of the computer readable medium include but are not limited to: an electronic connection (an electronic device) with one or N wires, a portable computer disk case (a magnetic device), a random access memory (RAM), a read only memory (ROM), an erasable programmable read-only memory (EPROM or a flash memory), an optical fiber device and a portable compact disk read-only memory (CDROM). In addition, the computer readable medium may even be a paper or other appropriate medium capable of being printed with programs thereon, this is because, for example, the paper or other appropriate medium may be optically scanned and then edited, decrypted or processed with other appropriate methods when necessary to obtain the programs in an electric manner, and then the programs may be stored in the computer memory.

It should be understood that each part of the present disclosure may be realized by the hardware, software, firmware or their combination. In the above embodiments, more steps or methods may be realized by the software or firmware stored in the memory and executed by the appropriate instruction execution system. For example, if it is realized by the hardware, likewise in another embodiment, the steps or methods may be realized by one or a combination of the following techniques known in the art: a discrete logic circuit having a logic gate circuit for realizing a logic function of a data signal, an application-specific integrated circuit having an appropriate combination logic gate circuit, a programmable gate array (PGA), a field programmable gate array (FPGA), etc.

Those skilled in the art shall understand that all or parts of the steps in the above method of the embodiments of the present disclosure may be achieved by instructing the related hardware by programs. The programs may be stored in a computer readable storage medium, and the programs include one or a combination of the steps in the method embodiments of the present disclosure when run on a computer.

In addition, each function cell of the embodiments of the present disclosure may be integrated in a processing module, or these cells may exist separately physically, or two or more cells are integrated in a processing module. The integrated module may be realized in a form of hardware or in a form of software function modules. When the integrated module is realized in a form of software function module and is sold or used as a standalone product, the integrated module may be stored in a computer readable storage medium.

The storage medium mentioned above may be read-only memories, magnetic disks, CD, etc. Although embodiments according to the present disclosure have been shown and described, it would be appreciated by those skilled in the art that the above embodiments are illustrative and cannot be construed to limitation on the present disclosure, and changes, alternatives, modifications, and variations can be made in the embodiments without departing from scope of the present disclosure.

INDUSTRIAL APPLICABILITY

The present disclosure relates to the technical field of space management and the technical field of air conditioners, and provides a space recommendation method, device, and system based on an air conditioning system, and a storage medium. The method for space recommendation based on the air conditioning system includes: obtaining a user space usage request, where the user space usage request carries demand information of a user for a space; determining a current energy consumption amount of each of the plurality of air conditioning units; determining a candidate space based on the current energy consumption amount; and recommending an available space based on the demand information and the candidate space. The space recommendation method, device, and system based on the air conditioning system, and the storage medium according to the present disclosure solve a problem that energy conservation of the air conditioning system is poor because centralized operation of the air conditioning system is not considered in an existing space recommendation process. Moreover, space recommendation may be performed based on a current energy consumption amount of the air conditioning system. Therefore, user demand is effectively matched with optimization of energy consumption of the air conditioning system, and an energy-saving effect is realized.

In addition, it can be understood that the space recommendation method, device, and system based on the air conditioning system and storage medium according to the present disclosure can be reproduced, and can be applied in a variety of applications. For example, the space recommendation method, device, and system based on the air conditioning system and storage medium according to the present disclosure can be applied in the technical field of space management and air conditioners.

What is claimed is:

1. A method for space recommendation based on an air conditioning system, the method comprising:
   obtaining a user space usage request, wherein the user space usage request includes demand information of a user for a space;
   determining a current energy consumption amount of each of a plurality of air conditioning units of the air conditioning system, wherein each of the plurality of air conditioning units comprises a plurality of air conditioning terminal devices, the plurality of air conditioning terminal devices is respectively arranged in a plurality of spaces, and wherein determining the current energy consumption amount of each of the plurality of the air conditioning units comprises determining an operation state of an air conditioning terminal device of a currently occupied space in the plurality of spaces, a current temperature of the currently occupied space, a predetermined temperature of the air conditioning terminal device, and a temperature change rate in the currently occupied space; and determining the energy consumption amount of an air conditioning terminal device of each currently occupied space based on the operation state, the current temperature, the predetermined temperature, and the temperature change rate, comprising:

in accordance with a determination that the operation state of the air conditioning terminal device is in an on-state, determining the energy consumption amount of the air conditioning terminal device in the space based on the temperature change rate and a temperature difference between the predetermined temperature and the current temperature, wherein the temperature difference is positively correlated with the energy consumption amount, the temperature change rate comprises a temperature deviation change rate and a temperature approaching change rate, the temperature deviation change rate is negatively correlated with the energy consumption amount, and the temperature approaching change rate being positively correlated with the energy consumption amount, wherein the temperature deviation change rate refers to a change rate at which the current temperature is changing away from the predetermined temperature, and the temperature approaching change rate refers to a change rate at which the current temperature is changing close to the predetermined temperature;

automatically determining a candidate space from the plurality of spaces based on the current energy consumption amount;

recommending an available space based on the demand information and the candidate space;

receiving a user selection of the recommended available space; and in response to receiving the user selection of the recommended available space, optimizing an amount of energy-saving effect of the air conditioning system while providing air conditioning to the recommended available space.

2. The method for space recommendation based on the air conditioning system according to claim 1, wherein determining the current energy consumption amount of each of the plurality of air conditioning units comprises:

obtaining a number of spaces currently occupied in the plurality of spaces; and determining the current energy consumption amount of the air conditioning unit based on the number of spaces currently occupied and a maximum energy consumption amount of each of the plurality of air conditioning terminal devices.

3. The method for space recommendation based on the air conditioning system according to claim 1, wherein determining the energy consumption amount of the air conditioning terminal device of each currently occupied space based on the operation state, the current temperature, the predetermined temperature, and the temperature change rate comprises:

in accordance with a determination that the operation state of the air conditioning terminal device is in an off-state, determining the energy consumption amount of the air conditioning terminal device in the space based on the temperature difference between the predetermined temperature and the current temperature.

4. The method for space recommendation based on the air conditioning system according to claim 1, wherein determining the energy consumption amount of the air conditioning terminal device of each currently occupied space based on the operation state, the current temperature, the predetermined temperature, and the temperature change rate comprises:

classifying the energy consumption amount of the air conditioning terminal device into different grades based on the operation state, the current temperature, the predetermined temperature, and the temperature change rate; and determining the energy consumption amount of the air conditioning terminal device based on an energy consumption amount corresponding to each grade.

5. The method for space recommendation based on the air conditioning system according to claim 1, wherein determining the candidate space based on the current energy consumption amount comprises:

determining the candidate space based on a deviation value between the current energy consumption amount of each of the plurality of air conditioning units and a predetermined preferred energy consumption range.

6. The method for space recommendation based on an air conditioning system according to claim 5, wherein determining the candidate space based on the deviation value between the current energy consumption amount of each of the plurality of air conditioning units and the predetermined preferred energy consumption range comprises:

determining, in response to the current energy consumption amount of the air conditioning unit being smaller than a lower limit value of the predetermined preferred energy consumption range, a space corresponding to the air conditioning unit as the candidate space when a difference of the current energy consumption amount of the air conditioning unit subtracted from the lower limit value of the predetermined preferred energy consumption range is smaller than or equal to a maximum energy consumption amount of a single air conditioning terminal device; and determining, in response to the current energy consumption amount of the air conditioning unit being greater than the lower limit value of the predetermined preferred energy consumption range and being smaller than an upper limit value of the predetermined preferred energy consumption range, the space corresponding to the air conditioning unit as the candidate space when a difference of the current energy consumption amount of the air conditioning unit subtracted from the upper limit value of the predetermined preferred energy consumption range is greater than or equal to the maximum energy consumption amount of the single air conditioning terminal device.

7. The method for space recommendation based on the air conditioning system according to claim 1, wherein recommending the available space based on the demand information and the candidate space comprises:

determining one or more priority levels of one or more unoccupied spaces in the candidate space; and determining the available space from the unoccupied spaces based on the demand information in accordance with the priority levels of the unoccupied spaces.

8. The method for space recommendation based on the air conditioning system according to claim 7, wherein the priority levels of the unoccupied spaces in the candidate space are determined by one or more of:

determining the priority levels of the unoccupied spaces from high to low based on a deviation value between a current temperature of each unoccupied space and a predetermined temperature from small to great; and determining the priority levels of the unoccupied spaces from high to low based on a distance of each unoccupied space from an occupied space from near to far.

9. The method for space recommendation based on the air conditioning system according to claim 7, wherein determining the available space from the unoccupied spaces based on the demand information in accordance with the priority levels of the unoccupied spaces comprises:

updating the priority levels of the unoccupied spaces based on a matching degree between space configuration information of each unoccupied space and the demand information; and determining the available space from the unoccupied spaces based on the updated priority levels of the unoccupied spaces.

10. The method for space recommendation based on the air conditioning system according to claim 7, wherein the demand information comprises a number of spaces expected to be used, and determining the available space from the unoccupied spaces based on the demand information in accordance with the priority levels of the unoccupied spaces further comprises:

determining the available space from the unoccupied spaces based on the number of spaces expected to be used in accordance with the priority levels of the unoccupied spaces.

11. The method for space recommendation based on the air conditioning system according to claim 1, wherein the space comprises a hotel room, the user space usage request comprises a check-in request of the user for the hotel room, and the demand information comprises a desired number of rooms and a usage time, and a desired hardware configuration condition of the user for the hotel room.

12. The method for space recommendation based on the air conditioning system according to claim 1, wherein recommending the available space based on the demand information and the candidate space comprises:

comparing the demand information with space configuration information of an unoccupied space in the candidate space; and determining the available space from spaces beyond the candidate space when no space having space configuration information matching with the demand information is in the candidate space.

13. A space recommendation system, comprising:
a space management terminal;
one or more processors; and
memory storing one or more programs, the one or more programs comprising instructions that, when executed by the one or more processors, cause the one or more processors to perform operations comprising:

obtaining a user space usage request, wherein the user space usage request includes demand information of a user for a space;

determining a current energy consumption amount of each of a plurality of air conditioning units of the air conditioning system, wherein each of the plurality of air conditioning units comprises a plurality of air conditioning terminal devices, the plurality of air conditioning terminal devices is respectively arranged in a plurality of spaces;

determining a candidate space from the plurality of spaces based on the current energy consumption amount, and wherein determining the current energy consumption amount of each of the plurality of the air conditioning units comprises determining an operation state of an air conditioning terminal device of a currently occupied space in the plurality of spaces, a current temperature of the currently occupied space, a predetermined temperature of the air conditioning terminal device, and a temperature change rate in the currently occupied space; and determining the energy consumption amount of an air conditioning terminal device of each currently occupied space based on the operation state, the current temperature, the predetermined temperature, and the temperature change rate, comprising:

in accordance with a determination that the operation state of the air conditioning terminal device is in an on-state, automatically determining the energy consumption amount of the air conditioning terminal device in the space based on the temperature change rate and a temperature difference between the predetermined temperature and the current temperature, wherein the temperature difference is positively correlated with the energy consumption amount, the temperature change rate comprises a temperature deviation change rate and a temperature approaching change rate, the temperature deviation change rate is negatively correlated with the energy consumption amount, and the temperature approaching change rate being positively correlated with the energy consumption amount, wherein the temperature deviation change rate refers to a change rate at which the current temperature is changing away from the predetermined temperature, and the temperature approaching change rate refers to a change rate at which the current temperature is changing close to the predetermined temperature;

recommending an available space based on the demand information and the candidate space;

receiving a user selection of the recommended available space; and in response to receiving the user selection of the recommended available space, optimizing an amount of energy-saving effect of the air conditioning system while providing air conditioning to the recommended available space.

14. The space recommendation system of claim 13, wherein determining the current energy consumption amount of each of the plurality of air conditioning units comprises:

obtaining a number of spaces currently occupied in the plurality of spaces; and determining the current energy consumption amount of the air conditioning unit based on the number of spaces currently occupied and a maximum energy consumption amount of each of the plurality of air conditioning terminal devices.

15. The space recommendation system of claim 13, wherein determining the energy consumption amount of the air conditioning terminal device of each currently occupied space based on the operation state, the current temperature, the predetermined temperature, and the temperature change rate comprises:

in accordance with a determination that the operation state of the air conditioning terminal device is in an off-state, determining the energy consumption amount of the air conditioning terminal device in the space based on the temperature difference between the predetermined temperature and the current temperature.

16. A non-transitory computer-readable storage medium, storing a computer program, the computer program, when executed by one or more processors of an electronic device, cause the one or more processors to perform operations comprising:

obtaining a user space usage request, wherein the user space usage request includes demand information of a user for a space;

determining a current energy consumption amount of each of a plurality of air conditioning units of the air conditioning system, wherein each of the plurality of air conditioning units comprises a plurality of air conditioning terminal devices, the plurality of air conditioning terminal devices is respectively arranged in a plurality of spaces, and wherein determining the current energy consumption amount of each of the plurality of the air conditioning units comprises determining an operation state of an air conditioning terminal device of a currently occupied space in the plurality of spaces, a current temperature of the currently occupied space, a predetermined temperature of the air conditioning terminal device, and a temperature change rate in the currently occupied space; and determining the energy consumption amount of an air conditioning terminal device of each currently occupied space based on the operation state, the current temperature, the predetermined temperature, and the temperature change rate, comprising:

in accordance with a determination that the operation state of the air conditioning terminal device is in an on-state, determining the energy consumption amount of the air conditioning terminal device in the space based on the temperature change rate and a temperature difference between the predetermined temperature and the current temperature, wherein the temperature difference is positively correlated with the energy consumption amount, the temperature change rate comprises a temperature deviation change rate and a temperature approaching change rate, the temperature deviation change rate is negatively correlated with the energy consumption amount, and the temperature approaching change rate being positively correlated with the energy consumption amount, wherein the temperature deviation change rate refers to a change rate at which the current temperature is changing away from the predetermined temperature, and the temperature approaching change rate refers to a change rate at which the current temperature is changing close to the predetermined temperature;

automatically determining a candidate space from the plurality of spaces based on the current energy consumption amount;

recommending an available space based on the demand information and the candidate space;

receiving a user selection of the recommended available space; and in response to receiving the user selection of the recommended available space, optimizing an amount of energy-saving effect of the air conditioning system while providing air conditioning to the recommended available space.

17. The non-transitory computer-readable storage medium of claim 16, wherein determining the current energy consumption amount of each of the plurality of air conditioning units comprises:

obtaining a number of spaces currently occupied in the plurality of spaces; and determining the current energy consumption amount of the air conditioning unit based on the number of spaces currently occupied and a maximum energy consumption amount of each of the plurality of air conditioning terminal devices.

* * * * *